Aug. 13, 1940.    K. WAHL    2,211,185
PROCESS OF PROJECTING FILMS
Filed Aug. 7, 1937    2 Sheets-Sheet 1
Fig. 1.
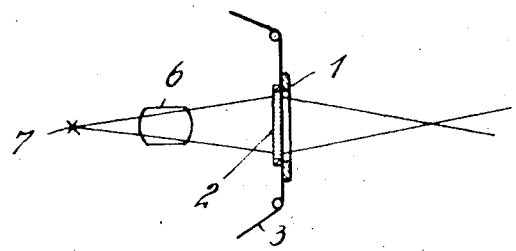
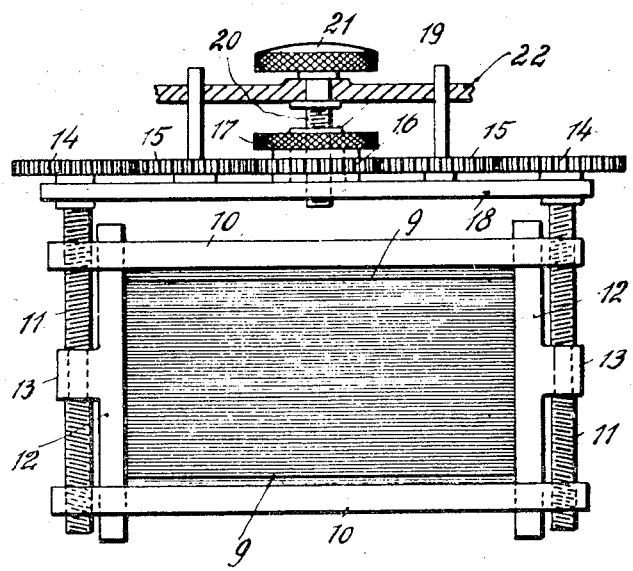
Fig. 2.
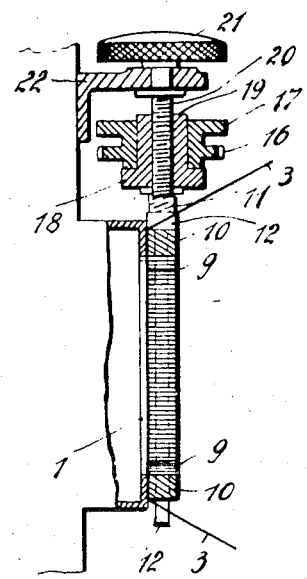
Fig. 3.
Inventor:
Karl Wahl Aug. 13, 1940. K. WAHL 2,211,185
PROCESS OF PROJECTING FILMS
Filed Aug. 7, 1937 2 Sheets-Sheet 2
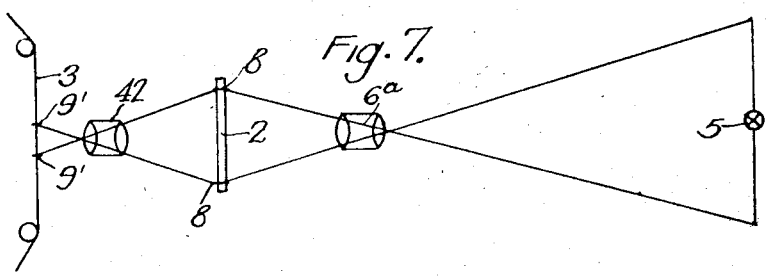
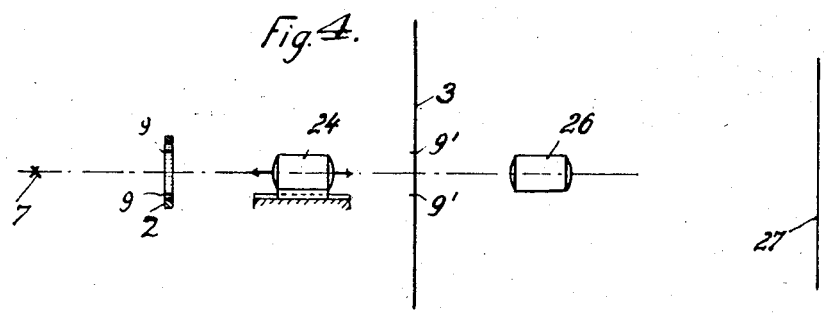
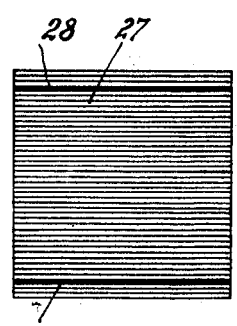
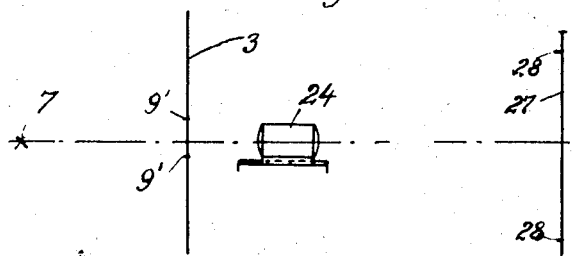
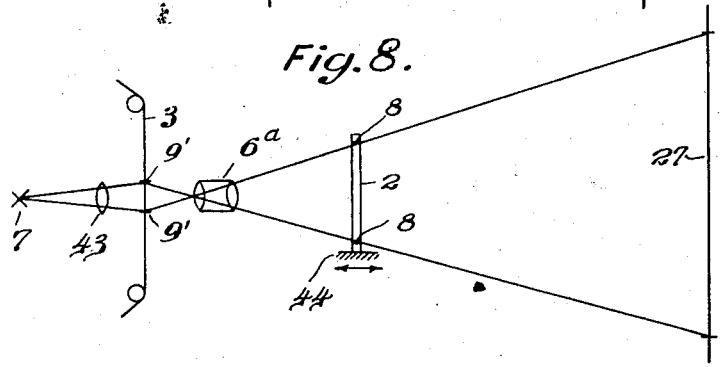
Inventor:
Karl Wahl Patented Aug. 13, 1940

2,211,185

UNITED STATES PATENT OFFICE 2,211,185

PROCESS OF PROJECTING FILMS

Karl Wahl, Berlin-Treptow, Germany

Application August 7, 1937, Serial No. 157,967
In Germany June 11, 1936

1 Claim. (Cl. 88—16.4)

It is known to produce color films in such a manner that the screen or the lamellar filter does not form a part of the exposure material, but is used separately. This process has the advantage that any suitable film may be used as exposure material and only a fixed screen or lamellar filter is brought into contact with the exposure material. With a wrong exposure there is not involved the loss of valuable negative material; moreover, it is possible to produce any desired number of copies from a negative obtained in this way by means of a normal copying process; these copies, in conjunction with a screen which is constructed similarly to the exposure screen, serve for projections and demonstration.

Owing to the shrinkage of the positive material, distortions of color occur during projection which are detrimental to a correct reproduction of color. To avoid this fault, during exposure, picture area markings are made for controlling the projection of the film according to its shrinkages. The reproduction screen is altered mechanically, or automatically according to the shrinkages of the positive material.

Figure 1 diagrammatically illustrates the projection of the picture.

Figures 2 and 3 show a color screen in front view and longitudinal section respectively.

Figures 4 and 5 illustrate diagrammatically two arrangements for the projection of films.

Figure 6 is a front elevation of a projecting screen constructed in accordance with the invention.

Figures 7 and 8 represent diagrammatically further arrangements for film projection.

In Figure 1, 1 is the gate of a projecting apparatus, 2 is the filter, 3 is the film, 6 is the lens and 7 is the source of light brought in front of the lens.

The screen 2 consists of a frame in which the basic colors are super-imposed in layers upon one another. The construction of the screen is as follows:

Very thin layers, for example of Celluloid, are poured several times upon each other and are then cut through transversely so that thin filters are produced, which contain the basic colors linearly side by side. Between the individual color layers, very thin intermediate layers in black or white may be poured in so that the lines in the basic colors are separated by white or black. The marking lines 9 in the screen are formed by black or white colored marking lines, corresponding to strips. The insertion of the strips is made in such a manner that, for instance, between each color a thin black or white strip is inserted. At the upper edge, a thick black or white strip is also inserted (marking strip) whereupon further color zones are formed. On the image projected there then appear the white and black marking lines, as white or black, or invisible lines respectively. Also instead of on the screen 2, the marking lines may be fixed to the projection screen.

According to the invention, marking lines 9' (Figs. 4, 5, 7 and 8) are applied at the outset to the film 3 which correspond with the marking lines 9 and hence, during projection, if the marking lines of the films coincide with the fixed marking lines of the screen 2, then no shrinkage has taken place.

If shrinkage has occurred in the film for any reason, possibly in the drying process or through other influences, then the colors present in the film do not agree with those in the color screen and produce an inaccurate picture with wrong colors. To avoid this, the color screen frame and also the screen layers themselves are adjustable. The color screen frame consists of the two cross rails 10, which engage with spindles 11, provided with right hand and left hand threads. The two longitudinal sides 12 of the frame have projections 13 and are fixed against axial movement on the threaded spindles. The upper ends of the spindles carry wheels 14 which by means of intermediate wheels 15 are in engagement with a central wheel 16. The wheel 16 is actuated by a disc 17. The spindles and also the wheels are carried by a plate 18. The plate 18 carries in the middle a raised part 19 constructed as a nut, through which a threaded spindle 20 passes, which is provided with a turning knob 21. The spindle 20 is rotatable in a plate 22 fitted in the casing of the camera. The shafts of the wheels 15 are extended upwards and may be displaced up and down in the plate 22 whereby the color screen frame is prevented from turning.

For producing an exact reproduction of a picture, the marking lines 9' on the film must coincide exactly with the black or white strips 9 arranged in the filter frame. If there is no coincidence, then the strips arranged in the screen frame may be pressed together or slightly loosened by turning the discs 17 or the spindles 11. It is also possible by turning the knob 21 to displace the whole frame upwards or downwards.

In Figure 4, the reproduction of the color film is illustrated. 7 is the source of light, 2 is the color lamellar filter with the marking lines 9, 24 is an objective lens which can be adjusted, 3 is a film to be projected, with marking lines 9' corresponding to the marking lines 9 of the color lamellar filter, 26 is the projection objective lens, and 27 is the projection screen or surface. If, during the projection, the marking lines 9 and 9' coincide, the color reproduction is perfectly satisfactory. Deviation may be corrected by adjusting the objective 24 or the color filter 2, so that it is always possible to obtain coincidence mechanically or optically.

Figure 5 shows another example of the process of reproducing the color film according to the invention. 7 is again the source of light, 3 is the film with the marking lines 9', 24 is the projection objective lens, 27 is the projection surface on which the marking lines 28 are provided.

Figure 6 shows the projection screen or surface in front elevation with the marking lines 28. The projection surface is covered parallel to the marking lines with bands in the basic colors. The number of the color bands corresponds to the number of color laminations of the exposure filter. In this example of carrying out the invention, the normal projection apparatus may thus be used. If, on projection, the marking lines of the film and of the projection surface coincide, then color covering or coincidence is obtained, otherwise, it is necessary to obtain an exact coincidence of the marking lines and thus of the colors, either by adjustment of the objective lens or of the projection surface.

The filters needed for the process according to the invention must as a rule be very small, that is, in the normal film, in the order of magnitude of a picture of 18 by 24 millimetres. It is very difficult to accommodate the individual color layers in the necessary degree of fineness within such an extraordinarily small space. The manufacture of filters of this kind therefore involves great difficulties.

A filter of any desired size may however, be used and brought optically to the size of a film picture in the following manner:

The light rays of the object to be exposed are passed through an objective lens and then pass through a filter of large dimensions. From here the light rays pass through a further lens which operates as a condenser and the rays are then directed upon the film in the size of the film picture.

On reproduction of the film on the projection screen, the light rays of the picture are again passed through an objective lens and then through a large filter and are transmitted on to the projection screen. In this case, the filter is displaceably arranged on a fixed base, in order to bring the marking lines of the filter into coincidence with those of the film.

In the arrangement for photographing an object as shown in Fig. 7, 5 is the object to be photographically recorded, 6a an objective lens and 2 is a filter with marking lines 9. 42 is a further objective lens which serves as a condenser and 3 the film with marking lines 9'.

In the projection arrangement shown in Figure 8, 7 is a source of light, and 43 is a condenser. 3 is again the film with marking lines 9', 6a is the objective lens and 2 is a smaller filter. The filter is fitted on a base 44 and displaceably arranged. 27 is the projection screen showing the enlarged picture.

I claim:

A process of obtaining correct color effects during projection of a shrunk film with a lamellar color screen consisting in applying initially coinciding marks to said screen and said film separate and distinct from the color lamella, and compressing the lamella of said screen to reestablish coincidence of said marks during projection of the film to compensate for distortion due to shrinkage of the film.

KARL WAHL.